(12) United States Patent
Gaggini

(10) Patent No.: US 6,951,679 B2
(45) Date of Patent: Oct. 4, 2005

(54) SURFACES OF TRANSPARENT RESIN IN WHICH MARBLE OR OTHER STONES ARE EMBEDDED

(76) Inventor: Silena Gaggini, Via Peschiera 1 - 56038 Ponsacco, Pisa (IT)

(*) Notice: Subject to any disclaimer, the term of this patent is extended or adjusted under 35 U.S.C. 154(b) by 0 days.

(21) Appl. No.: 10/697,212

(22) Filed: Oct. 30, 2003

(65) Prior Publication Data

US 2004/0091670 A1 May 13, 2004

Related U.S. Application Data

(62) Division of application No. 09/913,011, filed as application No. PCT/IT00/00036 on Feb. 7, 2000, now Pat. No. 6,699,415.

(30) Foreign Application Priority Data

Feb. 9, 1999 (IT) .......................................... FI99A0028

(51) Int. Cl.[7] .............................. B32B 3/14; B32B 3/30
(52) U.S. Cl. ....................... 428/150; 428/143; 428/149; 428/67; 52/315; 52/309.14; 52/316; 52/318
(58) Field of Search ................................. 428/143, 149, 428/150, 67; 52/315, 309.14, 316, 318

(56) References Cited

U.S. PATENT DOCUMENTS

| 3,170,808 A | * | 2/1965 | Almy et al. ................ 427/559 |
| 3,324,213 A | * | 6/1967 | Anfinset ...................... 264/71 |
| 3,344,011 A | * | 9/1967 | Goozner ...................... 428/67 |
| 3,378,617 A | * | 4/1968 | Elmendorf .................. 264/162 |
| 3,420,925 A | * | 1/1969 | Sharif ......................... 264/102 |

FOREIGN PATENT DOCUMENTS

| DE | 2 300 674 | 7/1973 |
| EP | 0 267 997 A1 | 5/1988 |
| JP | 07100816 | 4/1995 |

OTHER PUBLICATIONS

Shikoku Chemical Industries Co. Ltd., 1980, *Produce Artificial Stone Plate Floor* . . . , Database WPI, Section Ch, Week 198024.

Shikoku Chemical Industries Co. Ltd., 1989, *Clay Artificial Stone Build Contain* . . . , Database WPI, Section Ch, Week 198925.

* cited by examiner

*Primary Examiner*—William P. Watkins, III
(74) *Attorney, Agent, or Firm*—McGlew and Tuttle, P.C.

(57) ABSTRACT

A coated bathroom or kitchen component product includes a transparent polymerized resin and inserts of gravel of marble and/or other stones embedded substantially uniformly in the transparent polymerized resin. The inserts have a coplanar leveled surface at a surface of the component. The inserts are surrounded by a surface of the polymerized resin defining surface depressions having a lowest depression surface in a region between inserts and the surface of the polymerized resin rising form the lowest depression surface to the level of the surface of the component adjacent to the inserts.

11 Claims, 1 Drawing Sheet

SURFACES OF TRANSPARENT RESIN IN WHICH MARBLE OR OTHER STONES ARE EMBEDDED

CROSS REFERENCE TO RELATED APPLICATION

This is a divisional application of U.S. application Ser. No. 09/913,011 of Aug. 8, 2001 now U.S. Pat. No. 6,699,415, which is a 371 of PCT/IT00/00036 filed Feb. 7, 2000 (the contents of U.S. application Ser. No. 09/913,011 are hereby incorporated by reference).

FIELD AND BACKGROUND OF THE INVENTION

The invention relates to a product with special characteristics, which can be used as a product for coatings, for components of sanitary ware and in kitchen fittings and domestic worktops. This product consists of a polymerized transparent resin—which may be colored—in which inserts consisting of gravel of marble and/or of other stones, which may also be obtained from waste recovered from other processes, preferably rounded, are embedded substantially uniformly.

SUMMARY OF THE INVENTION

To obtain particular effects, to ensure surface protection of the resin, and for other purposes or advantages, according to the invention it is envisaged that the useful surface of the product should be produced by brushing with abrasives, so as to obtain slight depressions corresponding to the resin, whereas slight projections, distributed substantially uniformly and surrounded by the depressions, are delineated corresponding to the inserts.

Advantageously, in one possible embodiment, prior to brushing with abrasives the product is "decapitated" (i.e. machined for uniform removal of a limited thickness) whereby the inserts appear at the surface with smoothed surfaces; the slight projections formed by the inserts remain smoothed, co-planar (flush) and surrounded by the slight depressions obtained by brushing.

Brushing can be followed by a surface polishing treatment of the resin and of the inserts.

The invention also relates to a product for coatings, for components of sanitary ware and kitchen fittings and for domestic worktops, consisting of a polymerized transparent resin—which may also be more or less colored—in which inserts consisting of gravel of marble and/or other stones, even obtained from waste recovered from other processes, are embedded substantially uniformly. This product according to the invention is characterized in that there are slight projections corresponding to the inserts, and slight depressions corresponding to the resin, on the useful surface of the of the product.

Advantageously, the inserts may be smoothed at the surface (as a result of the "decapitation" machining), so that the projections become smoothed and coplanar (flush) and surrounded by the slight depressions.

The invention will be better understood by following the description in and the appended drawing, which shows a practical, non-limiting example of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
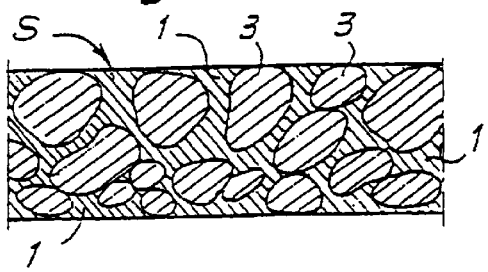
FIG. 1 is a sectional view showing a starting product that is to be processed according to the invention.

Referring to the drawings in particular, as illustrated in the accompanying drawing, using a technique that is already known (as described in another previous Italian patent application filed on 19 Mar. 1995 No. FI/96/A/54 by the same applicant), a conglomerate is formed from a transparent, and possibly colored, synthetic resin 1, and a number of inserts 3 that are embedded in the resin and are in the form of gravel or other stone material, either natural, or possibly obtained from waste from previous processing, for example by treatment of fragments from previous processing to obtain the rounded shapes that are assumed in nature by gravel that is moved naturally by the water of stretches of water; the resin is then polymerized. The polymerized resin is sufficiently transparent or completely transparent, so that the inserts 3 can be seen through the thickness of the resin.

The surface obtained with the product of the aforementioned type, as illustrated in FIG. 1, has a surface S that is intended to be seen, which is normally geometrically flat. A flat surface as stated above offers an appearance that is very uniform and so has characteristics that are not always acceptable. Moreover, as the surface S consists almost entirely of the polymerized resin 1, its resistance to mechanical wear and to stresses of the thermal type—for example caused by placing metallic cooking utensils thereon, which are at a relatively high temperature—does not offer the stability that should preferably be offered by surfaces that are to be used in the domestic situation, for example surfaces of kitchen worktops or surfaces in living rooms etc.

Figure 2:
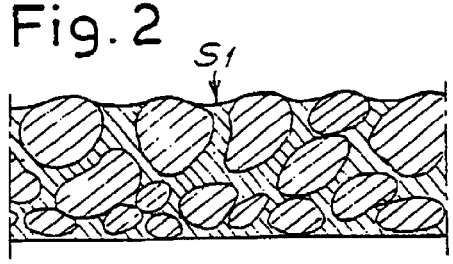
FIG. 2 is a sectional view showing the product from FIG. 1, processed by simple abrasion and brushing.

According to the invention, it is proposed to treat the surface S by brushing more or less intensively with abrasives of successively increasing fineness, so as to obtain wear of the uncovered surface of the resin whereas the inserts offer greater resistance; therefore after treatment the surface S1, as shown in FIG. 2, has become undulating through the effect of wear of the resin zones and the greater resistance that is offered by the structure (which remains practically unchanged) of the surface inserts embedded in the resin. In consequence, the surface S1 is defined by the projecting portions represented by the surfaces of the inserts coming to the surface and by zones where there are slight depressions and undulation, which are formed by the resin, which accordingly does not come into direct contact with any objects that are placed on the product that has been treated in this way.

According to a further development of the invention, the starting product shown in FIG. 1 is first worked by removing a thickness X (so-called "decapitation") which gives rise to the formation of a flat surface S10 (FIG. 3); this surface S10 consists partly of the resin and partly of the stone material of the inserts that was worn away together with the resin, and which therefore forms surfaces I that are substantially flat, flush, and appearing on surface S10. In this case too, after the process of removal of a thickness X, i.e. after the so-called "decapitation" of the surface inserts—shown as 13 in FIG. 3.—brushing with abrasives is carried out as already indicated for the processing as in FIG. 2; therefore the final surface consists (FIGS. 4 and 6) of the zones I of the "decapitated" inserts 13 and the surfaces S13 forming slight depressions that are connected to the leveled surfaces I and have a slightly rounded periphery. In this case as well, objects placed on the final surface of the treated product rest on the zones I represented by the material of the stone inserts 13, whereas the surfaces in the depressions S13 are protected from contact with the objects, which are supported purely by surfaces I.

"Decapitation" tends to lower the percentage of surface created by the resin, so as to increase the resistance to heat, and to wear.

Figure 3:
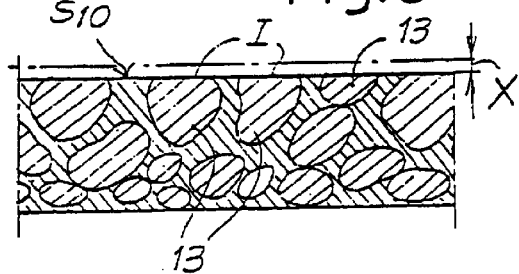
FIG. 3 is a sectional view showing the product that is first treated by removing a uniform thickness (decapitation)
Figure 4:
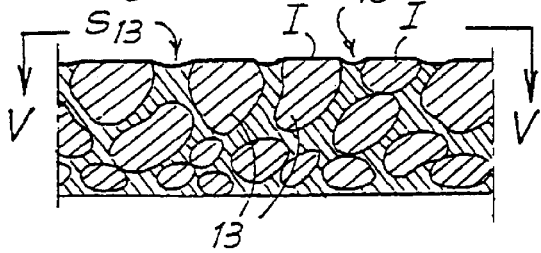
FIG. 4 is a sectional view showing the treatment, following the step of FIG. 3, by abrasion and brushing according to the invention.
Figure 5:
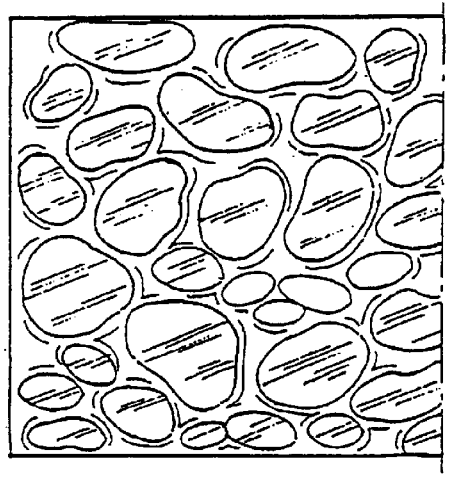
FIG. 5 is a sectional view showing along line V—V in FIG. 4.
Figure 6:
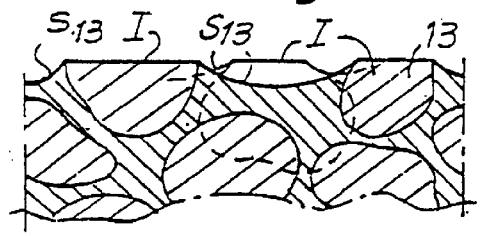
FIG. 6 shows a greatly magnified detail of the product as in FIG. 4.

The slightly undulating appearance of the surfaces obtained by the treatment defined above—and as illustrated in FIG. 2 or in FIGS. 4 and 6—is certainly more pleasant and also differs in other ways from the appearance of a smooth surface such as that consisting of resin completely as designated by S in FIG. 1 or consisting of the surface S10 and the surfaces I of the "decapitated." material 13, as shown in FIG. 3. Conversely, the structure as the obtained with reference to FIG. 2 or as obtained with reference to FIGS. 4 and 6 as will have a more characteristic and varying appearance, than a surface that is completely and monotonously flat As well as the aesthetic advantage described above, there is a functional effect in that the depressions such as those of surface S1 or those re of surface S13—formed by the polymerized resin—are protected from wear and from thermal effects that might otherwise be exerted on the resin by the placing, for example, of a cooking vessel or some other object that might be placed thereon for whatever purpose, for example on a kitchen worktop. The projecting surfaces (such as those I or such as those rounded off in FIG. 2), being formed by the stone inserts, are resistant to wear and to heat, and keep, their polish for a long time.

The polymerized resin must be transparent or substantially transparent after polymerization, so as to permit the inserts 3 or 13 to be visible, like gravel immersed in clear water. Since these resins may undergo a slight color change over time, the transparent resin can also advantageously be slightly colored at the start, so as to avoid an excessive color change such as can result from yellowing of resin that is purely transparent and colorless when polymerized, some time after manufacture of the product; this possible color change over time is added to the slight initial coloration of the transparent mass of polymerized resin, thus avoiding excessively pronounced differentiation due to the color change that occurs over time.

The drawing shows just one example, given purely as a practical demonstration of the invention, and the invention can vary in forms and arrangements though without leaving the scope of the concept indicated by the invention. While a specific embodiment of the invention has been shown and described in detail to illustrate the application of the principles of the invention, it will be understood that the invention may be embodied otherwise without departing from such principles.

What is claimed is:

1. A coating product for components of sanitary ware, kitchen fittings and surfaces, the coating product consisting of:
    a transparent polymerized resin;
    inserts consisting of gravel of marble and/or other stones embedded substantially uniformly in said resin with the resin polymerized with the inserts therein, with at least some of said inserts having a planar surface and otherwise being surrounded by said resin, said planar surfaces and a surface of said resin defining a useful surface, said useful surface having projections corresponding to said planar surfaces of the inserts and slight depressions corresponding to a region of the resin surface surrounding the projections, wherein the lowest depression surface of the surface of said resin to highest point of the surface of said resin at a level the planar surfaces and at edges of the inserts is graduated and free of any steps, nosings or irregularities.

2. A product as in claim 1, wherein the transparent polymerized resin is slightly colored.

3. A coating product consisting of:
    a polymerized transparent resin; and
    inserts consisting of gravel of marble and/or other stones, said inserts being embedded substantially uniformly, the coating product being formed by:
    embedding the inserts in a liquid resin;
    polymerizing the liquid resin and then hardening the liquid resin in order to form the useful surface of the product as a rigid structure;
    decapitating the rigid structure by removing a limited thickness, so that the inserts appear with leveled surfaces formed by the inserts which are then flush with the surface of the hardened resin forming a flat free surface;
    processing the free surface by brushing with abrasives in order to remove superficial parts of the resin, so as to obtain slight depressions corresponding to the resin, whereas, corresponding to the inserts, there are slight projections, distributed substantially uniformly and surrounded by the depressions wherein from a lowest level of the depressions of the resin surface to highest point of the resin surface, at a level of the leveled surface of said inserts and at an edge of said inserts, is graduated and free from any steps or irregularities.

4. A product as in claim 3, wherein brushing is followed by a surface polishing treatment of the resin and of the inserts.

5. A product as in claim 3, wherein the polymerized resin is slightly colored.

6. A product as in claim 5, wherein brushing is followed by a surface polishing treatment of the resin and of the inserts.

7. A coated bathroom or kitchen component product, comprising:
    a transparent polymerized resin;
    inserts consisting of gravel of marble and/or other stones embedded substantially uniformly in said transparent polymerized resin, said inserts including surface inserts having a coplanar leveled surface at a surface of the component and said surface inserts being surrounded by a surface of said polymerized resin defining surface depressions at the surface of the component with a lowest depression surface in a region between inserts and said polymerized resin rising from said lowest depression surface to a level of said coplanar leveled surface at an edge of said surface inserts wherein an area running from said lowest depression surface of said resin to the edge of said inserts said level of said coplanar leveled surface is graduated and free from any steps or irregularities.

8. A product as in claim 7, wherein said transparent polymerized resin is slightly colored.

9. A product as in claim 3, wherein said brushing acts on said free surface with a weak abrasive action such that said resin remains transparent.

10. A product as in claim 3, wherein said brushing acts on said free surface with a weak abrasive action such that a formation of rough irregularities along the edge of said inserts is prevented.

11. A coated bathroom or kitchen component product according to claim 7, wherein a surface continuity void of any irregularities exists between said coplanar leveled surface and said surface depressions.

* * * * *